(12) United States Patent
Van Horsen et al.

(10) Patent No.: US 10,757,953 B2
(45) Date of Patent: Sep. 1, 2020

(54) NON-HYDROGENATED HARDSTOCK FAT

(75) Inventors: Dirk Simon Hendrikus Van Horsen, At Vlaardingen (NL); Hindrik Huizinga, At Vlaardingen (NL); Cornelis Laurentius Sassen, At Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 2363 days.

(21) Appl. No.: 11/992,554

(22) PCT Filed: Aug. 21, 2006

(86) PCT No.: PCT/EP2006/008208
§ 371 (c)(1),
(2), (4) Date: Mar. 25, 2008

(87) PCT Pub. No.: WO2007/039020
PCT Pub. Date: Apr. 12, 2007

(65) Prior Publication Data
US 2009/0263559 A1 Oct. 22, 2009

(30) Foreign Application Priority Data
Sep. 26, 2005 (EP) .................... 05077195

(51) Int. Cl.
*A23D 7/00* (2006.01)
*C11C 3/04* (2006.01)
*A23D 7/015* (2006.01)

(52) U.S. Cl.
CPC ............. *A23D 7/001* (2013.01); *A23D 7/015* (2013.01); *C11C 3/04* (2013.01)

(58) Field of Classification Search
USPC ........................................................ 426/606
See application file for complete search history.

(56) References Cited

U.S. PATENT DOCUMENTS

| | | | |
|---|---|---|---|
| 4,360,536 A | 11/1982 | Keuning et al. | |
| 4,366,181 A | 12/1982 | Dijkshoorn et al. | |
| 4,486,457 A | 12/1984 | Schijf et al. | |
| 4,533,561 A | 8/1985 | Ward | |
| 5,587,195 A | 12/1996 | Sassen et al. | |
| 5,858,445 A | 1/1999 | Huizinga et al. | |
| 6,033,695 A | 3/2000 | Cain et al. | |
| 6,106,885 A | 8/2000 | Huizinga et al. | |
| 6,156,370 A | 12/2000 | Huizinga et al. | |
| 6,231,914 B1 | 5/2001 | Huizinga et al. | |
| 6,777,018 B2 * | 8/2004 | Floeter .................... | A23D 7/04 426/603 |
| 7,618,670 B2 | 11/2009 | Ullanoormadam | |
| 7,645,473 B2 | 1/2010 | Herzing et al. | |
| 7,700,146 B2 | 4/2010 | Cleenewerck | |
| 7,785,645 B2 | 8/2010 | Siew et al. | |
| 7,807,208 B2 | 10/2010 | Ullanoormadam | |
| 7,998,521 B2 | 8/2011 | Huizinga et al. | |
| 2005/0019316 A1 | 1/2005 | Ten Brink et al. | |

FOREIGN PATENT DOCUMENTS

| | | |
|---|---|---|
| CA | 2098314 | 12/1994 |
| EP | 0151450 | 8/1987 |
| EP | 0488800 | 6/1992 |
| EP | 1419699 | * 5/2004 |
| GB | 953451 A | 3/1964 |
| GB | 1444820 | 8/1976 |
| GB | 1444829 | 8/1976 |
| JP | 54031407 | 3/1979 |
| WO | WO 96/19115 | 6/1996 |
| WO | WO 03/084337 | 10/2003 |
| WO | WO03096817 | 11/2003 |
| WO | WO 2007/039020 | 12/2007 |

OTHER PUBLICATIONS

International Search Report International Application No. PCT/EP2006/008208 dated Oct. 17, 2006.
European Search Report Application No. 05077195.5 dated Feb. 7, 2006.
Van den Enden et al., "A Method for the Determination of the Solid Phase Content of Fats Using Pulse Nuclear Magnetic Resonance", Fette, Seifen Anstrichmittel 80, Jahrgang, Nr. 5, 1978, pp. 180-186.
Co-pending U.S. Application Huizinga et al., U.S. Appl. No. 11/990,798, filed Feb. 21, 2008.
All et al., Melting and Solidification Characteristics of Confectionery Fats: Anhydrous Milk Fat, Cocoa Butter and Palm Kernel Stearin Blends, Journal of the American Oil Chemists Society, Aug. 8, 1994, 803-806, 71(8), AOCS Press.
Graille et al., Melting and Solidification Characteristics of Confectionery Fats: Anhydrous Milk Fat, Cocoa Butter and Palm Kernel Stearin Blends, Elaeis JAOCS, Jun. 1992, pp. 803-806, 4(1).
Graille J et al., Making Value-Added Products From Palm Oil by 1-3 Regioselectivity Enzymatic Interesterification, Elaeis, Institut Penyelidikan Kelapa Sawit, Kuala Lumpur MY, Jun. 1992, pp. 1-10XP008025711, vol. 4 No. 1.
IPRP in PCTEP2006008023, dated Dec. 7, 2007.

(Continued)

*Primary Examiner* — Katherine D Leblanc
(74) *Attorney, Agent, or Firm* — Arent Fox LLP

(57) ABSTRACT

Hardstock fat having an amount of saturated fatty acids of at least 80 wt %, • wherein the amount of H3mixed triglycerides is between 45 and 60 wt %, H3mixed being a group of triglycerides consisting of triglycerol esters of 3 H fatty acids wherein H is a saturated fatty acids having a length of C16 and/or C18, wherein the triglycerol ester is composed of two different fatty acids; • and wherein the amount of H2Xmixed triglycerides is at least 10 wt %, H2Xmixed being a group of triglycerides consisting of H2M triglycerides and H2O triglycerides, wherein H2M triglycerides are triglycerol esters with two H fatty acid and one M fatty acid wherein M is a saturated fatty acid of a length of C12 and/or C14, and wherein H2O triglycerides are triglycerol esters with two H fatty acid and one O fatty acid wherein O is a unsaturated fatty acid of a length of C18, wherein the H2M and H2O triglycerides are composed of three different fatty acids.

22 Claims, No Drawings

(56) References Cited

OTHER PUBLICATIONS

Ong, Palm Oil and Palm Kernel Oil, Korean J. Food Sci. Technol, Jan. 1, 1982, 187-194, 14, No. 2, US.
Search Report and Written Opinion in EP05077195, dated Jan. 9, 2006.
Search Report in PCTEP2006008023, dated Dec. 7, 2006.
Siew, Identity Characters of Malaysian Palm Oil Products, Elaeis 1993 vol. 5-1 p. 38, Jun. 1, 1993, pp. 38-46, 5-1, Elaeis, US.
Written Opinion in EP06791577, dated Sep. 13, 2012.
Written Opinion in PCTEP2006008208, dated Oct. 17, 2016.
Written Opinion1 in EP06791577, dated Jun. 8, 2010.
Written Opinion2 in EP06791577, dated Jan. 28, 2015.
Written Opinion3 in EP06791577, dated Oct. 29, 2015.
Written Opinion4 in EP06791577, dated Jul. 6, 2016.

\* cited by examiner

NON-HYDROGENATED HARDSTOCK FAT

The invention relates to a new hardstock fat which is non-hydrogenated and to margarines prepared with this hardstock fat.

BACKGROUND

The fat phase of margarine and of similar fat continuous emulsion spreads is often a mixture of a liquid fat or oil and a fat which is solid at room and/or ambient temperature.

The solid fat, denoted as hardstock fat, serves to structure the fat phase and helps to stabilise the emulsion.

For nutritional reasons in recent years the desire is expressed that the level of saturated fatty acids (SAFA) of the fats should be kept as low as possible.

W/O emulsion spreads have been on the market for some time aiming to meet this need. Typically, the margarine fat of these products consists of about 87% liquid oil, e.g. sunflower oil and 13% of a hardstock consisting of a randomly interesterified mixture of fully hardened lauric fat, e.g. fully hardened palmkernel oil, and fully hardened palm oil.

Nowadays there are consumers who express concern about chemically modifying fats e.g. by hydrogenating or hardening, which may result in trans-unsaturation if partial hardening is involved.

To meet the need for spreads with low contents of SAFA in the margarine fat which have been produced without using hydrogenation, CA 2 098 314 proposes to prepare hardstock by chemically interesterifying a blend of generally equal proportions of palm stearin and palmkernel stearin.

This approach of CA 2 098 314 results in products with higher SAFA contents and lower cis unsaturated fatty acid (UFA) contents.

WO96/19115 describes a plastic W/O emulsion spread comprising 5-14 wt % of a hardstock being a stearin fraction of an interesterified mixture of 25-65 wt %, unhardened lauric fat stearin and 75-35 wt % unhardened C16+ fat stearin.

In addition there is also a trend towards lower fat spreads. The hardstock described above are not very suitable for low fat spread which still have a relatively large amount of poly unsaturated fatty acids (PUFA).

Often an additional hardstock is needed to structure the low fat spreads.

Furthermore these known margarine fats contain appreciable amounts of lauric acids. The presence of lauric acids may have a negative impact on the flavour of the product, because of hydrolysis that occurs during storage.

There is therefore a need for margarine fats that are as good as the prior art products in respect of nutritional properties as well as the sensoric properties of the resulting spreads, but that have been produced without the use of hydrogenation. Furthermore a hardstock fat is needed that is suitable for low fat high PUFA spreads. Moreover a margarine fat with less lauric fatty acids is preferred.

We have now found that one or more of the above mentioned objectives can be reached by a hardstock fat having an amount of saturated fatty acids of at least 80 wt %, wherein the amount of $H3_{mixed}$ triglycerides is between 45 and 60 wt %, and wherein the amount of $H2X_{mixed}$ triglycerides is at least 10 wt %.

DETAILED DESCRIPTION

For the purpose of the invention $H3_{mixed}$ is a group of triglycerides consisting of triglycerol esters of 3H fatty acids wherein H is a saturated fatty acids having a length of C16 and/or C18. $H3_{mixed}$ is therefor a mix of different triglycerides PPS, PSP, PSS and SPS wherein P stands for palmitic acid (C16) and S for stearic acid (C18). For example PSP stands for a triglyceride where the two palmitic acid are present at the terminal position and the stearic acid in the middle position, and PPS is a triglyceride where a palmitic and a stearic acid are present at the terminal position and a palmitic acid in the middle position. The amount of $H3_{mixed}$ is the combined amount of all different H3 triglycerides composed of two different fatty acids.

$H2X_{mixed}$ is a group of triglycerides consisting of particular H2M triglycerides and H2O triglycerides.

H2M triglycerides are triglycerol esters with two H fatty acid and one M fatty acid wherein M is a saturated fatty acid of a length of C12 and/or C14. Also H2M represents a mix of different triglycerides e.g SSMy, PPMy, SPMy, SSLa, PPLa, SPLa, wherein P stands for palmitic acid (C16) and S for stearic acid (C18), My for myristic acid (C14) and La for lauric acid (C12). For example SMyP comprises a triglycerides where the a stearic acids and a palmitic acid are present on the terminal position and the myristic acid in the middle position, and SPMy a triglyceride wherein a stearic and a myristic acid are present at the terminal position and a palmitic acid at the middle position.

H2O triglycerides are triglycerol esters with two H fatty acid and one O fatty acid wherein O is a unsaturated fatty acid of a length of C18 (C18:1). Suitably the monounsaturated fatty acid with a length of C18 is olein.

Also H2O represents a mix of different triglycerides e.g SSO, PPO, SPO, PSO and POS, wherein P stands for palmitic acid (C16) and S for stearic acid (C18), O for oleic acid.

For the purpose of the invention the amount of $H2X_{mixed}$ is the combined amount of particular H2M and H2O triglycerides which are composed of three different fatty acids, such as SPMy, PSMy, SMyP, SPLa, PSLa, SLaP, PSO, SPO, or POS.

The terms "fat" and "oil" are used in this specification as synonyms. The term "hardstock" refers to a fat that is solid at room temperature. The hardstock may comprise two or more different hard fats, but is preferably a single fat. The hardstock fat may be an interesterified mixture of one or more fats.

A "margarine fat" is a fat blend which is suitable for use as a fat in spreads, both fat-continuous and water-continuous, such a margarine fat usually includes a hardstock and a liquid oil.

The term "liquid oil" is used in this specification for fats that are liquid at room temperature preferably also liquid at temperature below room temperature such as below 15, 10 or 5° C. Preferably the solid fat content of the liquid oil is 0 at 20° C., more preferably it is 0 at 15° C.

Solid fats from which lower melting constituents have been removed will be indicated as "stearin fractions". A stearin fraction for the purpose of this description and claims is defined as a triglyceride mixture or fat blend from which at least 10% of the lower melting constituents have been removed by some kind of fractionation, e.g. dry fractionation, multi-stage countercurrent dry fractionation or solvent fractionation.

The lower melting constituents are indicated as "olein fraction"

In this specification all parts, proportions and percentages are by weight; the amount of fatty acids in an oil or fat is based on the total amount of fatty acids in said oil or fat and the amount of hardstock and/or hard fat in the fat composition is based on the total weight of said fat composition, unless otherwise stated.

The solid fat content (SFC) in this description and claims is expressed as N-value, essentially as defined in Fette, Seifen Anstrichmittel 80 180-186 (1978). The stabilisation profile applied is heating to a temperature of 80° C., keeping the oil for at least 10 minutes at 60° C. or higher, keeping the oil for 16 hours at 0° C. and then 30 minutes at the measuring temperature, except where indicated otherwise.

Non-hydrogenated means that the fat or oil has not undergone any hydrogenation treatment. This entails the starting ingredients as well as blends and interesterified mixtures and even fractions of fats.

Preferably non-hydrogenated fats have less than 5 wt % of trans-fatty acids, more preferably less than 3 wt % trans-fatty acids, or even essentially no trans-fatty acids.

The present invention is suitable for more natural products. More natural means that the product has undergone less modifications or preferably even no modifications other than refining and purification. Natural also encompasses the use of non-chemical variants of treatments, for example dry (non solvent) fractionation instead of wet (solvent) fractionation, with e.g. acetone, hexane or lanza and enzymatic rearrangement instead of chemical randomisation.

In a preferred embodiment of the present invention the combined amount of saturated fatty acids having a length of C12 and/or C14 is 12 to 24 wt %. Preferably the amount of saturated fatty acids with a length of C16 is from 43 to 55. Suitable amounts of saturated fatty acids having a length of C16 and C18 is 55 to 68 wt %. The amount of saturated fatty acids with a length of C18 is preferably between 9 and 15. A preferred amount of monounsaturated fatty acid with a length of C18 (C18:1) is less than 17 wt %. Preferably the amount of poly unsaturated fatty acids (PUFA), C18:2 and C18:3 is less than 3 wt %.

A very suitable hardstock according to the invention is a hardstock having a combined amount of saturated fatty acids having a length of C12 and/or C14 of 18 to 24 wt %. Preferably the amount of saturated fatty acids with a length of C16 is from 48 to 55. Suitable amounts of saturated fatty acids having a length of C16 and C18 is 60 to 68 wt %. A preferred amount of monounsaturated fatty acid with a length of C18 (C18:1) is less than 15 wt %. Suitably the monounsaturated fatty acid with a length of C18 is olein. The weight percentage is given on the hardstock fat.

This hardstock fat is very suitable for use in fat-continuous spread, e.g in a heart health product, where the SAFA content is less than 20 wt %, the PUFA content is at least 50 wt % and the MUFA content is at least 30 wt %, while the products is virtually free from trans-fatty acids, preferably less than 3 wt % of trans fatty acids.

In one embodiment the hardstock fat according to the invention has a solid fat content of from 88 to 98 at 10° C., from 75 to 90 at 20° C., from 50 to 67 at 30° C. and from 32 to 52 at 35° C. and from 16 to 36 at 40° C.

Suitably the hardstock fat has a solid fat content of from 94 to 98% at 10° C., from 85 to 90% at 20° C., from 62 to 67% at 30° C. and from 45 to 52 at 35° C., and from 30 to 36 at 40° C. This hardstock fat is very suitable for use in fat-continuous spread, e.g in a heart health product, where the SAFA content is less than 20 wt %, the PUFA content is at least 50 wt % and the MUFA content is at least 30 wt %, while the products is virtually free from trans-fatty acids, preferably less than 3 wt % of trans fatty acids.

The present invention also relates to a hardstock fat comprising 15 to 40 wt % of a lauric fat and 45 to 70 wt % of palm oil and 10 to 20 wt % of a high C18 fat which has at least 40 wt % of fatty acids of C18 length.

Preferably the mix of lauric fat, palm oil and high C18 fat is an interesterified mixture.

Preferably the interesterification was done enzymatically.

A lauric fat is a fat that has a lauric fatty acid content of at least 35 wt %, preferably at least 40 wt %. Preferably 17 to 30 wt % of a lauric fat is used in the mixture. Suitably the lauric fat is selected from the group comprising palm kernel fat, coconut fat and babassu. Also fractions of the lauric fat may used. Preferably the lauric fat is dry-fractionated to retain the naturalness of the hardstock fat.

Palm oil may be present in the mixture in a preferred amount of from 55 to 67 wt %. Suitably fractions of palm oil are used herein and combinations of palm oil and or palm oil fractions are envisioned.

The high C18 fat has at least 20 wt %, preferably at least 25 wt % of saturated fatty acids with C18 length. It may also be preferred that the high C18 fat has 20 to 30 wt % of saturated fatty acids of C18 length. The weight percentage is on high C18 fat. Preferably 15 to 20 wt % of high C18 fat is used in the interesterified mixture.

Furthermore, in another preferred embodiment the high C18 fat is selected from the group comprising shea fat or even shea butter as it is often called, illipe pentadesma, shea olein, or shea stearin. A preferred fat is shea stearin.

Suitably the hardstock fat is a single fat. The advantage of having a single hardstock fat compared to a blend of different fats is that only one type of fat needs to be prepared.

Furthermore, with a single fat there is no need for blending two or more different fats in specific ratios. For the purpose of the invention a single fat is envisioned to encompass one fat but also one interesterified mixture is regarded as a single fat.

Furthermore the present invention also relates to a process for producing a hardstock fat according to the invention comprising:
interesterifying a mixture 15 to 40 wt % of a lauric fat and 45 to 70 wt % of palm oil and 10 to 20 wt % of a high C18 fat which has at least 20 wt % of saturated fatty acids of C18 length, optionally fractionating the interesterified mixture, such that the resulting hardstock fat has an amount of saturated fatty acids of at least 80 wt %, wherein the amount of $H3_{mixed}$ triglycerides is between 45 and 60 wt %, and wherein the amount of $H2X_{mixed}$ triglycerides is at least 10 wt %.

Preferably the hardstock fat has a combined amount of saturated fatty acids having a length of C12 and C14 of 12 to 24 wt %, the combined amount of saturated fatty acids having a length of C16 and C18 of 55 to 68 wt %, the amount of saturated fatty acids with a length of C16 from 43 to 55 wt %, the amount of saturated fatty acids with a length of C18 from 9 to 15 wt %, and the total amount of fully saturated fatty acids from 80 to 85 wt %, an amount of mono-unsaturated fatty acids with a length of C18 (C18:1) of less than 17 wt %, and an amount of poly unsaturated fatty acids (PUFA) of less than 3.

Preferably 25 to 35 wt % of lauric fat is used in the interesterified mixture. Suitably the lauric fat may be selected from the group comprising palm kernel fat, coconut fat and babassu fat and fractions thereof and combinations thereof.

Suitably palm oil fractions are used, also combinations of fractions and/or palm oil may be used. The combined amount of the palm oil fat and/or palm oil fraction is preferably 55 to 67 wt %.

Preferably the high C18 fat has at least 25 wt % of saturated fatty acids of C18 length. A preferred high C18 fat is selected from the group comprising shea fat, pentadesma, illipe, shea olein, or shea stearin. A preferred fat is shea stearin.

Preferably 15 to 20 wt % of a high C18 fat is used in the interesterified mixture.

In a preferred embodiment of the present invention the combined amount of saturated fatty acids having a length of C12 and/or C14 is 18 to 24 wt %. Preferably the amount of saturated fatty acids with a length of C16 is from 48 to 55. Suitable amounts of saturated fatty acids having a length of C16 and C18 is 60 to 68 wt %. A preferred amount of monosaturated fatty acid with a length of C18 (C18:1) is less than 15 wt %.

Preferably the resulting fat has a solid fat content of 88 to 98 at 10° C., 75 to 90 at 20° C., 50 to 67 at 30° C. and 32 to 52 at 35° C. and 16 to 36 at 40° C. More preferably the hardstock fat has a solid fat content of 94 to 98% at 10° C., 85 to 90% at 20° C., 62 to 67% at 30° C. and 45 to 52 at 35° C., and 30 to 36 at 40° C.

In a preferred embodiment of the present invention the interesterification is catalysed by enzymes. Rearrangement by enzymes enhances the naturalness of the fat of the present invention.

Optionally the interesterified mixture is further fractionated. Preferably the interesterified mixture is dry-fractionated.

The present invention further relates to a margarine fat comprising a liquid vegetable oil in an amount of 50 to 95 wt % and a hardstock fat according to the invention in an amount of to 50 wt %. Preferably the amount of hardstock fat in the margarine fat is 5 to 30 wt %, more preferably 5-15 wt %. The amount of liquid oil is preferably wt %, more preferably wt %. The weight percentages are on margarine fat.

Suitable liquid vegetable oils for the margarine fat are selected from the group comprising rapeseed oil, sunflower oil, safflower oil, linseed oil, corn oil, groundnut oil, soybean oil, linola oil and blends thereof.

Furthermore the present invention relates to a margarine or fat-continuous spread comprising a margarine fat according to the invention.

In another embodiment the present invention also relates to a water-continuous spread comprising a margarine fat according to the invention.

EXAMPLES

Example 1

A hardstock was prepared with the following ingredients 16% of a shea stearin, 19% of a palm kernel fat and 65% of a Palm oil fraction. The fats were mixed and interesterified.

The hardstock fat had the following fatty acids profile

| | |
|---|---|
| C 8:0 | 0.8 |
| C 10:0 | 0.7 |
| C 12:0 | 9.3 |
| C 14:0 | 3.9 |
| C 16:0 | 53.9 |
| C 18:0 | 13.4 |
| C 18:1 | 14.4 |
| C 18:2 | 2.5 |
| C 18:3 | 0.0 |
| C 20:0 | 0.3 |
| C 20 mono unsat | 0.0 |

-continued

| | |
|---|---|
| C 22:0 | 0.0 |
| $H3_{mixed}$ | 47.8 |
| $H2X_{mixed}$ | 11.9 |
| SAFA | 82.2 |
| MUFA | 14.4 |
| PUFA | 2.5 |

Example 2

A hardstock was prepared with the following ingredients 13.5% of a shea stearin, 29.5% of a palm kernel fat and 57% of a palm oil fraction. The fats were mixed and interesterified.

The hardstock fat had the following fatty acids profile

| | |
|---|---|
| C 8:0 | 1.3 |
| C 10:0 | 1.1 |
| C 12:0 | 14.3 |
| C 14:0 | 5.4 |
| C 16:0 | 48.2 |
| C 18:0 | 11.7 |
| C 18:1 | 14.4 |
| C 18:2 | 2.5 |
| C 18:3 | 0.0 |
| C 20:0 | 0.3 |
| C 20 mono unsat | 0.0 |
| C 22:0 | 0.0 |
| $H3_{mixed}$ | 47.1 |
| $H2x_{mixed}$ | 11.5 |
| SAFA | 82.2 |
| MUFA | 14.4 |
| PUFA | 2.5 |

Example 3

A hardstock was prepared with the following ingredients 12% of a shea stearin, 36.5% of a palm kernel fat and 51.5% of a Palm oil fraction. The fats were mixed and interesterified.

The hardstock fat had the following fatty acids profile

| | |
|---|---|
| C 8:0 | 1.6 |
| C 10:0 | 1.4 |
| C 12:0 | 17.6 |
| C 14:0 | 6.4 |
| C 16:0 | 44.4 |
| C 18:0 | 10.7 |
| C 18:1 | 14.5 |
| C 18:2 | 2.5 |
| C 18:3 | 0.0 |
| C 20:0 | 0.2 |
| C 20 mono unsat | 0.0 |
| C 22:0 | 0.0 |
| $H3_{mixed}$ | 46.9 |
| $H2X_{mixed}$ | 10.9 |
| SAFA | 82.2 |
| MUFA | 14.5 |
| PUFA | 2.5 |

Example 4

A margarine was prepared with the hardstock of example 1 with the following ingredients:

|  |  | % |
|---|---|---|
| Fatblend |  | 34.74 |
| rapeseed oil | 16% |  |
| sunflower oil | 74% |  |
| hardstock example 1 | 10% |  |
| Monoglyceride |  | 0.16 |
| Lecithine |  | 0.05 |
| Colourant |  | 0.04 |
| Flavour (fat) |  | 0.01 |
| Total |  | 35 |
| Water |  | 63.54 |
| Acid |  | 0.1 |
| Thickener |  | 1.25 |
| Preservative |  | 0.1 |
| Flavour (water) |  | 0.01 |
| Total |  | 65 |
| SAFA |  | 20.0 |

Example 5

A margarine spread was prepared with the hardstock of example 1 with the following ingredients:

|  |  | % |
|---|---|---|
| Fatblend |  | 39.45 |
| sunflower oil | 78% |  |
| rapeseed oil | 10% |  |
| hardstock example 1 | 12% |  |
| Monoglyceride |  | 0.3 |
| Lecithine |  | 0.2 |
| Colourant |  | 0.04 |
| Flavour |  | 0.01 |
| Total |  | 40 |
| Water |  | 59.97 |
| Acid |  | 0.03 |
| Total |  | 60 |
| SAFA |  | 21.7 |

Example 6

A margarine spread was prepared with the hardstock of example 1 with the following ingredients:

|  |  | % |
|---|---|---|
| Fatblend |  | 58.95 |
| sunflower oil | 77% |  |
| rapeseed oil | 11% |  |
| hardstock example 1 | 12% |  |
| Monoglyceride |  | 0.6 |
| Lecithine |  | 0.4 |

|  | % |
|---|---|
| Colourant | 0.04 |
| Flavour | 0.01 |
| Total | 60 |
| Water | 39.8 |
| Acid | 0.2 |
| Total | 40 |
| SAFA | 21.5 |

The margarine had the following fatty acid profile:

|  | |
|---|---|
| C 8:0 | 0.1 |
| C 10:0 | 0.1 |
| C 12:0 | 1.3 |
| C 14:0 | 0.6 |
| C 16:0 | 11.6 |
| C 18:0 | 4.6 |
| C 18:1 | 29.9 |
| C 18:2 | 50.1 |
| C 18:3 | 0.9 |
| C 20:0 | 0.1 |
| C 20 mono unsat | 0.1 |
| C 22:0 | 0.3 |

Example 7

A light margarine spread was prepared with the hardstock of example 1 with the following ingredients:

|  |  | % |
|---|---|---|
| Fatblend |  | 24.55 |
| sunflower oil | 87% |  |
| hardstock example 1 | 13% |  |
| Monoglyceride |  | 0.35 |
| Lecithine |  | 0.05 |
| Colourant |  | 0.04 |
| Flavour |  | 0.01 |
| Total |  | 25 |
| Water |  | 66.17 |
| Starch |  | 6 |
| Thickener |  | 2.5 |
| Preservative |  | 0.13 |
| Acid |  | 0.2 |
| Total |  | 75 |

The margarine had the following fatty acid profile:

|  | |
|---|---|
| C 8:0 | 0.1 |
| C 10:0 | 0.1 |
| C 12:0 | 1.4 |
| C 14:0 | 0.6 |
| C 16:0 | 12.1 |
| C 18:0 | 5.0 |
| C 18:1 | 25.8 |
| C 18:2 | 54.2 |
| C 18:3 | 0.0 |
| C 20:0 | 0.0 |
| C 20 mono unsat | 0.0 |
| C 22:0 | 0.3 |

Example 8

Stability test were performed on the margarine spreads and compared to a margarine spread with a hydrogenated hardstock.

35% fat margarine spreads were compared.

Comparative Product:

|  |  | % |
|---|---|---|
| Fatblend |  | 34.74 |
| rapeseed oil | 16% |  |
| sunflower oil | 74% |  |
| hydrogenated hardstock | 10% |  |
| Monoglyceride |  | 0.16 |
| Lecithine |  | 0.05 |
| Colourant |  | 0.04 |
| Flavour (fat) |  | 0.01 |
| Total |  | 35 |
| Water |  | 63.54 |
| Acid |  | 0.1 |
| Thickener |  | 1.25 |
| Preservative |  | 0.1 |
| Flavour (water) |  | 0.01 |
| Total |  | 65 |
| SAFA |  | 21.7 |

The hydrogenated hardstock is an interesterified mixture of 60% fully hardened palm kernel oil and 40% hardened palm oil.

The comparative product was compared with the margarine spread from example 4.

Stability Test:

For 2 to 3 weeks:

12 hours at 20° C. and 12 hours at 5° C.

After every week droplet size and spreadability, and visual check on emulsion breakdown was performed.

After 3 weeks the comparative product had an acceptable stability, the emulsion had not broken down however the spreadability was perceived as moderate.

In contrast, the margarine of example 4 had a very good stability. No emulsion break down had occurred and the spreadability was still very good.

Example 9

Stability test were performed on the margarine spreads and compared to a margarine having two hardstock fats.

40% fat margarine spreads were compared.

Comparative Example

|  |  | % |
|---|---|---|
| Fatblend |  | 39.45 |
| sunflower oil | 76% |  |
| rapeseed oil | 10% |  |
| hardstock 1 | 8% |  |
| hardstock 2 | 6% |  |
| Monoglyceride |  | 0.3 |
| Lecithine |  | 0.2 |
| Colourant |  | 0.04 |
| Flavour |  | 0.01 |
| Total |  | 40 |
| Water |  | 59.97 |
| Acid |  | 0.03 |
| Total |  | 60 |
| SAFA |  | 23.0 | hardstock 1 is an interesterified mix of 65% of a palm oil fraction and 35% of palm kernel oil.

hardstock 2 is an interesterified mix of 60% of a palm oil fraction and 40 of a shea stearin.

The comparative product was compared with the margarine spread from example 5.

Stability Test:

For 2 to 3 weeks:

12 hours at 20° C. and 12 hours at 5° C.

After every week droplet size and spreadability, and visual check on emulsion breakdown was performed.

After 3 weeks both the comparative product and the margarine of example 5 had a very good stability. No emulsion break down had occurred and the spreadability was still very good. Showing that the single hardstock of the invention gives also very good products.

The invention claimed is:

1. A spread comprising a hardstock fat and water, wherein the hardstock fat is interesterified and comprises:
    a lauric fat in an amount of from 25 to 35 wt %;
    $H3_{mixed}$ triglycerides in an amount of from 45 to 60 wt %, $H3_{mixed}$ being a group of triglycerides consisting of triglycerol esters of 3 H fatty acids, wherein H is a saturated fatty acid having a length of C16 and/or C18, wherein the triglycerol ester is composed of two different fatty acids;
    $H2X_{mixed}$ triglycerides in an amount of at least 10 wt %, $H2X_{mixed}$ being a group of triglycerides consisting of H2M triglycerides and H2O triglycerides, wherein H2M triglycerides are triglycerol esters with two H fatty acids and one M fatty acid, wherein M is a saturated fatty acid of a length of C12 and/or C14, and wherein H2O triglycerides are triglycerol esters with two H fatty acids and one O fatty acid wherein O is a unsaturated fatty acid of a length of C18, wherein the H2M and H2O triglycerides are composed of three different fatty acids;
    saturated fatty acids in a total amount of at least 80 wt %, wherein the combined amount of saturated fatty acids having a length of C12 and C14 is from 12 to 24 wt %, the amount of saturated fatty acids having a length of C16 is from 43 to 55 wt %, the combined amount of saturated fatty acids having a length of C16 and C18 is from 55 to 68 wt %, the amount of saturated fatty acids having a length of C18 is from 9 to 15 wt %, and the total amount of fully saturated fatty acids is from 80 to 85 wt %;
    monounsaturated fatty acids with a length of C18 (C18:1) in an amount of less than 17 wt %;
    polyunsaturated fatty acids in an amount of less than 3 wt %.

2. The spread of claim 1, wherein the hardstock fat is non-hydrogenated.

3. The spread of claim 1, wherein the combined amount of saturated fatty acids having a length of C12 and C14 in the hardstock fat is from 18 to 24 wt %.

4. The spread of claim 1, wherein the amount of saturated fatty acids having a length of C16 in the hardstock fat is from 48 to 55 wt %.

5. The spread of claim 1, wherein the combined amount of saturated fatty acids having a length of C16 and C18 in the hardstock fat is from 60 to 68 wt %.

6. The spread of claim 1, wherein the amount of monounsaturated fatty acids with a length of C18 (C18:1) in the hardstock fat is less than 15 wt %.

7. The spread of claim 1, wherein the ratio of palmitic acid to stearic acid in the hardstock fat is from 3 to 5.

8. The spread of claim 1, wherein the hardstock fat has a solid fat content at 10° C. (N10) of from 88 to 98, a solid fat content at 20° C. (N20) of from 75 to 90, a solid fat content at 30° C. (N30) of from 50 to 67, a solid fat content at 35° C. (N35) of from 32 to 52, a solid fat content at 40° C. (N40) of from 16 to 36.

9. The spread of claim 1, wherein the hardstock fat is a single fat.

10. A process for producing the spread of claim 1, comprising:
interesterifying a mixture comprising 25 to 35 wt wt % of a lauric fat and 45 to 70 wt % of palm oil and 10 to 20 wt% of a high C18 fat which has at least 20 wt % of saturated fatty acids of C18 length; and
fractionating the interesterified mixture to produce a hardstock fat, wherein hardstock fat has an amount of saturated fatty acids of at least 80 wt %, wherein the amount of $H3_{mixed}$ triglycerides is between 45 and 60 wt %, and wherein the amount of $H2X_{mixed}$ triglycerides is at least 10 wt %, combining the hardstock fat and water, to produce the spread.

11. The process of claim 10, wherein the amount of palm oil is between 55 and 67 wt %.

12. The process of claim 10, wherein the amount of high C18 fat is between 15 and 20 wt %.

13. The process of claim 10, wherein the hardstock fat comprises a combined amount of saturated fatty acids having a length of C12 and C14 from 12 to 24 wt %, an amount of saturated fatty acids having a length of C16 from 43 to 55 wt %, a combined amount of saturated fatty acids having a length of C16 and C18 from 55 to 68 wt %, an amount of saturated fatty acids having a length of C18 from 9 to 15 wt %, an amount of monounsaturated fatty acids with a length of C18 (C18:1) of less than 17 wt %, a total amount of fully saturated fatty acids from 80 to 85 wt %, and an amount of polyunsaturated fatty acids of less than 3 wt %.

14. The process of claim 10, wherein the ratio of palmitic acid to stearic acid is from 3 to 5.

15. The process of claim 10, wherein the hardstock fat has a solid fat content at 10° C. (N10) of from 88 to 98, a solid fat content at 20° C. (N20) of from 75 to 90, a solid fat content at 30° C. (N30) of from 50 to 67, a solid fat content at 35° C. (N35) of from 32 to 52, and a solid fat content at 40° C. (N40) of from 16 to 36.

16. A spread comprising a margarine fat comprising a liquid vegetable oil in an amount of 50 to 95 wt % and a hardstock fat having an amount of saturated fatty acids of at least 80 wt %;
wherein the amount of $H3_{mixed}$ triglycerides in the hardstock fat is between 45 and 60 wt %, $H3_{mixed}$ being a group of triglycerides consisting of triglycerol esters of 3 H fatty acids wherein H is a saturated fatty acid having a length of C16 and/or C18, wherein the triglycerol ester is composed of two different fatty acids; and
wherein the amount of $H2X_{mixed}$ triglycerides in the hardstock fat is at least 10 wt %, $H2X_{mixed}$ being a group of triglycerides consisting of H2M triglycerides and H2O triglycerides, wherein H2M triglycerides are triglycerol esters with two H fatty acids and one M fatty acid wherein M is a saturated fatty acid of a length of C12 and/or C14, and wherein H2O triglycerides are triglycerol esters with two H fatty acids and one O fatty acid wherein O is a unsaturated fatty acid of a length of C18, wherein the H2M and H2O triglycerides are composed of three different fatty acids, said hardstock fat being in an amount of 5 to 50 wt %;
wherein the hardstock fat is interesterified, non-hydrogenated, and comprises a lauric fat in an amount of from 25 to 35 wt %.

17. The spread of claim 16, wherein the hardstock fat has a solid fat content at 10° C. (N10) of from 88 to 98, a solid fat content at 20° C. (N20) of from 75 to 90, a solid fat content at 30° C. (N30) of from 50 to 67, a solid fat content at 35° C. (N35) of from 32 to 52, and a solid fat content at 40° C. (N40) of from 16 to 36.

18. The spread of claim 17, wherein the hardstock fat has a solid fat content at 10° C. (N10) of from 88 to 98, a solid fat content at 20° C. (N20) of from 75 to 90, a solid fat content at 30° C. (N30) of from 50 to 67, a solid fat content at 35° C. (N35) of from 32 to 52, and a solid fat content at 40° C. (N40) of from 16 to 36.

19. The spread of claim 16, wherein the spread is fat-continuous.

20. The spread of claim 16, comprising 25-59% margarine fat and 40-66% water.

21. A spread comprising a hardstock fat and water, wherein the hardstock fat is interesterified and comprises:
a lauric fat in an amount of from 25 to 35 wt %;
$H3_{mixed}$ triglycerides in an amount of from 45 to 60 wt %, $H3_{mixed}$ being a group of triglycerides consisting of triglycerol esters of 3 H fatty acids, wherein H is a saturated fatty acid having a length of C16 and/or C18, wherein the triglycerol ester is composed of two different fatty acids; and
$H2X_{mixed}$ triglycerides in an amount of at least 10 wt %, $H2X_{mixed}$ being a group of triglycerides consisting of H2M triglycerides and H2O triglycerides, wherein H2M triglycerides are triglycerol esters with two H fatty acids and one M fatty acid, wherein M is a saturated fatty acid of a length of C12 and/or C14, and wherein H2O triglycerides are triglycerol esters with two H fatty acids and one O fatty acid wherein O is a unsaturated fatty acid of a length of C18, wherein the H2M and H2O triglycerides are composed of three different fatty acids.

22. The spread of claim 21, further comprising:
monounsaturated fatty acids with a length of C18 (C18:1) in an amount of less than 17 wt %; and
polyunsaturated fatty acids in an amount of less than 3 wt %.

* * * * *